Sept. 30, 1958

W. E. INGHAM 2,854,589

TRIGGER CIRCUITS AND SHIFTING REGISTERS
EMBODYING TRIGGER CIRCUITS

Filed Aug. 10, 1954

INVENTOR W. E. Ingham

BY Glascock Downing & Seebold

ATTORNEYS

United States Patent Office 2,854,589
Patented Sept. 30, 1958

2,854,589

TRIGGER CIRCUITS AND SHIFTING REGISTERS EMBODYING TRIGGER CIRCUITS

William Ellis Ingham, Ealing, London, England, assignor to Electric & Musical Industries Limited, Hayes, England, a company of Great Britain Application August 10, 1954, Serial No. 448,919

Claims priority, application Great Britain August 15, 1953

9 Claims. (Cl. 307—88.5)

Figure 1:
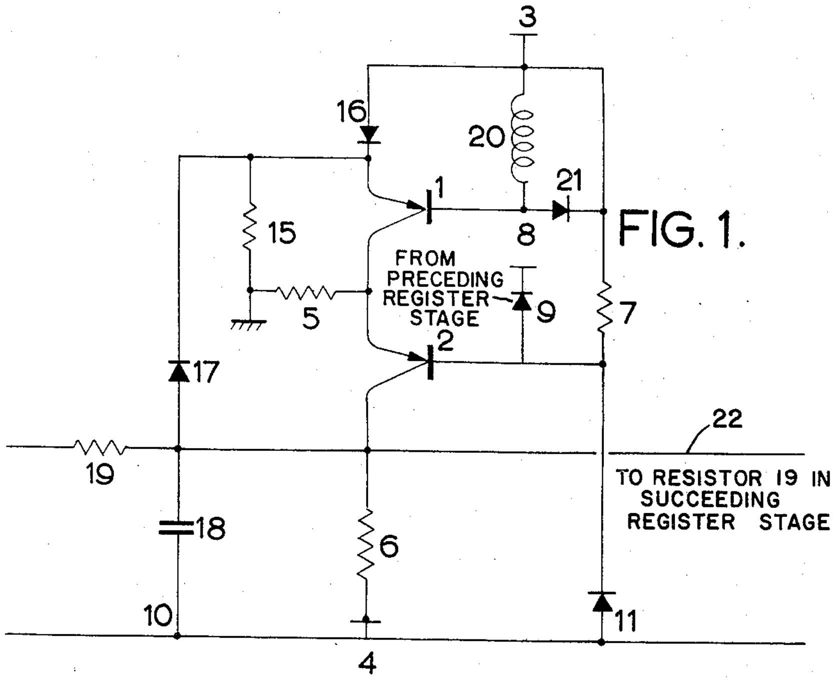

This invention relates to a binary register unit, especially for shifting registers such as are employed, for example, in electronic digital computors.

Shifting registers are frequently employed in electronic digital computers, recognition devices and other circuits of a similar nature. Usually a shifting register comprises a series of two-state elementary stages connected in cascade so that the register stages may assume different combinations of states representing different numbers expressed in binary digital code. The stages of the register are coupled one to another and to a source of shift pulses in such a way that the "state" of each stage can be shifted to the succeeding state so that in effect the registered number is displaced one place. A variety of forms of shifting registers have been proposed employing thermionic valve circuits as the elementary stages. However, the number of shifting register stages in a particular case tends to be large. It is desirable therefore that the number of components, power dissipation and the space required per stage should be small. Moreover, it is desirable that wide tolerances may be allowed in the values of the components employed. From the point of view of fulfilling these desirable conditions, thermionic valve circuits tend to be unsatisfactory.

It has therefore been proposed to construct shifting registers employing transistors instead of thermionic valves but in practice certain difficulties have been associated with such constructions. In a true shifting register the digit transfer should be entirely under the control of shift pulses so that the state of any one elementary stage may be changed without affecting any other stage and in prior constructions of shifting registers employing transistors this desirable feature has been absent or has been realised only by using large numbers of components.

The main object of the present invention is to provide an improved construction of binary register unit with a view to achieving the desirable features above indicated.

Another object of the present invention is to provide a binary register unit, suitable for use as one stage of a shifting register, comprising a bistable device and a monostable device, means for applying shift pulses to said devices, and a source of conditioning signals coupled to said monostable device so that the bistable device can be switched to either of its states in response to a shift pulse, in dependence upon the conditioning signal applied to the monostable device.

The expression "bistable device" means a device having two states of equilibrium both of which are (virtually) permanently stable. The expression "monostable device" means a device having two states of equilibrium one of which is (virtually) permanently stable and the other of which is only temporarily stable.

Figure 2:
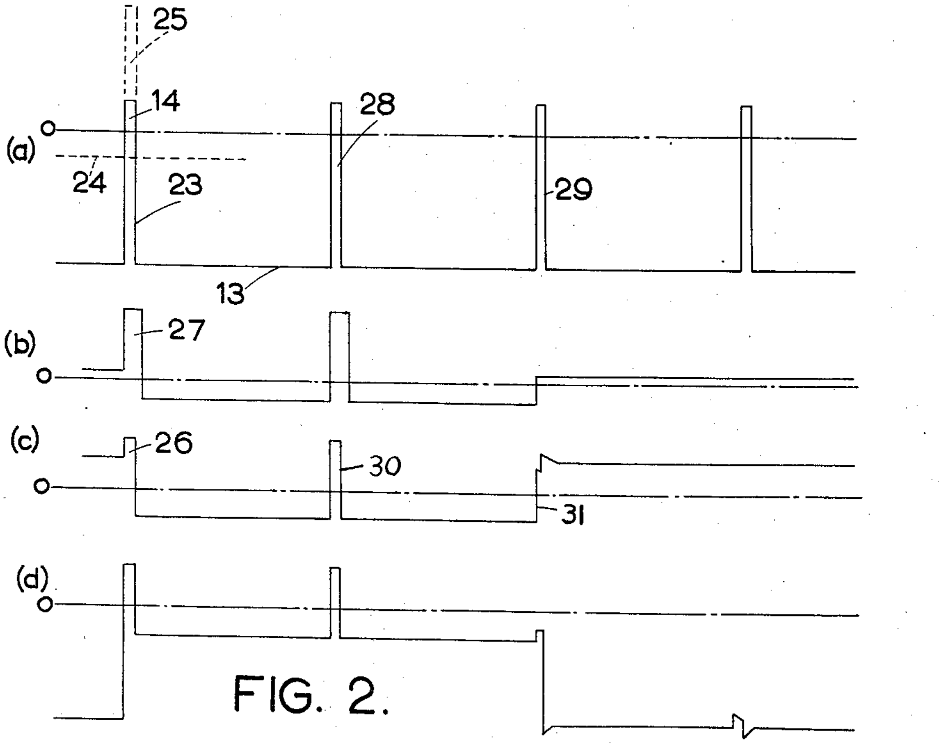

In order that the invention may be clearly understood and readily carried into effect, the invention will be described with reference to the accompanying drawings in which:

Figure 1 illustrates a binary register unit which is suitable for use as one stage of a shifting register in accordance with the present invention, and Figure 2 comprises waveform diagrams explanatory of the operation of Figure 1.

Referring to Figure 1, it will be assumed that the unit shown comprises an intermediate stage of a binary shifting register, the other units being of the same construction. The way in which the units are coupled will appear in the following description. The unit shown comprises two transistors 1 and 2, both transistors being of the point contact type having a current amplification factor, from emitter to collector of greater than unity. For energising the transistors, sources of positive and negative voltage are provided, denoted by the lines 3 and 4 respectively. The sources need only supply low positive and negative voltages respectively. The circuit of transistor 2 operates as a bistable device being (virtually) permanently stable when the transistor 2 is on and also when the transistor 2 is off. These two states are used to indicate the value of the binary digit stored in the respective stage. The emitter of the transistor 2 is grounded via resistor 5 while the collector is connected to the negative voltage source 4 via resistor 6. The base of the transistor 2 is connected to the positive voltage source 3 by resistor 7 and is also connected to a source of reference potential denoted by the line 8 via a rectifier 9. Resistor 5 is arranged to be smaller than the resistor 6 and the magnitudes of the resistors 5, 6 and 7 are selected so as to ensure stability of the circuit in both on and off conditions of the transistor 2.

The line 10 represents a shift pulse busbar to which shift pulses are applied in known manner from a source of shift pulses (not shown). There is a connection from the busbar 10 to the base of the transistor 2 through a rectifier 11. The shift pulses are assumed to have a positive polarity as indicated in Figure 2(*a*), and the datum level indicated by the reference 13 is arranged to be more negative than the voltage of the source 4. Moreover, the peak level 14 of the shift pulses corresponds approximately to the reference voltage from the source 8.

The circuit of transistor 1, which is (virtually) permanently stable when transistor 1 is off but only temporarily stable when transistor 1 is on, operates as a monostable device. The emitter is grounded via resistor 15 and connected to the positive voltage source 3 via rectifier 16. The emitter is also connected to the busbar 10 through the series combination of rectifier 17 and capacitor 18. The junction of 17 and 18 is connected by resistor 19 to the collector of the transistor corresponding to 2 in the preceding elementary stage of the shifting register. The base of the transistor 1 is connected through the inductor 20 to the positive voltage source 3 and the inductor 20 is shunted by rectifier 21. A terminal 22 represents a connection from the collector of the transistor 2 to the resistor corresponding to 19 in a succeeding elementary stage of the register.

In describing the operation of the unit and also of the register as a whole, it will be assumed that before the occurrence of the shift pulse denoted by 23 in Figure 2(*a*), the preceding stage of the register has the transistor corresponding to 2 conducting, so that the voltage applied to the left hand of resistor 19 is only slightly negative, as represented by the dotted line 24 in Figure 2(*a*). The capacitor 18 is charged to the same voltage so that when the shift pulse 23 occurs, the voltage of the emitter of the transistor 1 is raised by the pulse above that of the base, as represented by the dotted pulse 25 in Figure 2(*a*), causing the transistor 1 to be turned on. When the transistor 1 is turned on the inductor 20 in its base circuit ensures that the base current is initially small, and the monostable transistor is "bottomed," the collector voltage rising to a limiting positive value. This is represented by 27 in Figure 2(*b*) which shows the collector voltage of the transistor 1 and thus also the emitter voltage of the transistor 2. Eventually, the current through the inductor 20 rises sufficiently to switch off the transistor 1 but the inductance of the inductor 20 is arranged to be such, in relation to the impedance of the emitter circuit when the transistor 1 is conducting, that the transistor 1 remains on for a time which is longer than the duration of the shift pulse 23.

The same shift pulse 23 applied through the rectifier 11 tends to raise the base voltage of the transistor 2 but in this case since the transistor 2 was non-conducting before the shift pulse occurred, the base voltage is held near the level set by the voltage source 8 and the rectifier 9. The base voltage waveform for transistor 2 is illustrated in Figure 2(*c*). Therefore the shift pulse has no direct effect on the state of the transistor 2, but by virtue of the fact that the shift pulse switches on the transistor 1 and the collector voltage of the latter is raised positively the transistor 2 is switched on as it were indirectly and the base voltage then falls below that of the source 8 as represented by the termination of pulse 26 in Figure 2(*c*). Moreover, when the transistor 1 is eventually switched off, the transistor 2 remains in the conducting state since, as aforesaid, it is permanently stable in this state. The monostable circuit including the transistor therefore stores a representation of the state of the preceding stage of the register as it was before the shift pulse occurs and transfers it to the bistable circuit. When the transistor 1 is switched off, the voltage of its base tends to go positive due to the inductor 20 but the limiting action of the rectifier 21 associated with the action of the resistor 15 in drawing current through the rectifier 16 makes the non-conducting state of the transistor 1 permanently stable.

The functioning is similar if, before the occurrence of a shift pulse, the transistor corresponding to 2 in the previous stage is on, and the transistor 2 is also on. The shift pulse (pulse 28 of Figure 2(*a*) for example) then switches on the transistor 1 as above described and tends to switch-off the transistor 2 by raising its base potential, which is depressed below that of the source 8. The change in the base potential is represented by pulse 30 in Figure 2(*c*). However, the increase in emitter current and voltage of the transistor 1 counteracts the direct effect of the shift pulse on the transistor 2 and prevents the latter from being switched off. However, even if transistor 2 is switched off, it will be switched on again when the shift pulse ends by virtue of the fact that transistor 1 will yet be conducting.

If on the occurrence of a shift pulse, the transistor corresponding to 2 in the preceding stage is non-conducting, the collector voltage will be near that of the source 4 and the capacitor 18 will be charged only to this level. The shift pulse (pulse 29 of Figure 2(*a*) for example) then does not raise the potential of the junction of 18 and 19 sufficiently to cause the rectifier 17 to conduct, and the transistor 1 remains off. According to Figure 2 transistor 2 is represented as being conducting before the occurrence of the pulse 29, and pulse 29 now switches off the transistor 2, as represented by point 31 in Figure 2(*c*) since the shift pulse is not counteracted by the transistor 1. At the end of the pulse, moreover, the transistor 2 remains off since as aforesaid the transistor 1 has not been switched on, and so the state of the preceding elementary stage is transferred as required. A similar result would of course occur if the pulse 29 had found the transistor 2 in the non-conducting state. The voltage waveforms set up at the collector of the transistor 2 is represented as in Figure 2(*d*) and as aforesaid this waveform is applied to the resistor corresponding to 19 in the succeeding stage. By arranging that the resistor 5 is smaller than 6 relatively large voltage changes are set up at the collector by the changes in state of the transistor 2.

The time constant of the resistor 19 and capacitor 18 is arranged to be such that the effect of any shift pulse on the transistor 1 is not disturbed by a change in the state of the preceding stage brought about by the same shift pulse. The time constant of 19 and 18 must of course be sufficiently small to allow the capacitor 18 to be charged to substantially the voltage of the collector of the preceding stage in the interval between successive shift pulses.

It will be appreciated that by applying pulses individually to a given stage it can be caused to assume the state of the preceding stage without affecting any other stage.

The register unit shown has important advantages in that the shift pulse is applied directly to the base and is not gated thereto. One of the main practical difficulties with a bistable transistor circuit is to reset the transistor from the high to low current state, since this usually requires a fairly high current and consequently a low impedance source for the shift pulse. Thus, in the circuit shown it is sometimes required to set transistor 2 "on" and sometimes to set it "off," and while this could have been done by putting suitable gates between the shift pulse source and the transistor 2 so as to guide the shift pulse to set transistor 2 as required, such gates would have put unwanted impedance between the shift busbar and transistor 2. However, in the circuit shown, the shift pulse used to turn 2 off is applied directly to the base, via 11, in all circumstances, and when it is not required to be effective it is overruled by control pulses applied to the emitter from the monostable transistor 1. The pulse is therefore effectively gated without adding excessive impedance between the pulse source and the base. The construction of the monostable circuit gives a high input impedance for elements 17, 18 and 19, and is also capable of higher repetition rates than a monostable circuit employing capacitors. The rectifiers 16 and 21 may be for example germanium diodes and should preferably be of the higher impedance type. The rectifiers 9, 11 and 17 may also be germanium diodes.

What I claim is:

1. A binary register unit, suitable for use as one stage of a shifting register, comprising a bi-stable device, a mono-stable device, means for applying shift pulses to said bistable device to tend to switch said device to a predetermined one of its states, means for applying the same shift pulses to said monostable device to tend to switch said monostable device to its unstable state, a source of conditioning signals coupled to said monostable device to selectively induce or counteract switching of the monostable device to its unstable state in response to said shift pulses, said monostable device including means for maintaining the unstable state of said device for an interval of longer duration than a shift pulse, and a coupling from said monostable device to said bi-stable device for switching said bi-stable device to its other state in response to the monostable device in its unstable state.

2. A binary register unit, suitable for use as one stage of a shifting register, comprising a monostable device including a first transistor having high and low conductivity states respectively in the unstable and stable states of said monostable device, a bi-stable device including a second transistor, said transistor having high and low conductivity states respectively in the stable states of said device, means for applying shift pulses to an electrode of said second transistor to tend to switch said second transistor to its low conductivity state, means for applying the same shift pulses to an electrode of said first transistor to tend to switch said first transistor to its high conductivity state, a source of conditioning signals coupled to said first transistor to induce or counteract switching of said first transistor to its high conductivity state in response to said shift pulses, said monostable device including a means for maintaining the high conductivity state of said first transistor for an interval of longer duration than a shift pulse, and a coupling from said monostable device to said bi-stable device for switching said second transistor to its high conductivity state in response to said first transistor in its high conductivity state.

3. A register unit according to claim 2 said means for applying shift pulses to said second transistor comprising a source of shift pulses of positive polarity, and a connection from said source to the base electrode of said second transistor.

4. A register unit according to claim 3, said connection including a unilaterally conducting device.

5. A register unit according to claim 2, said coupling from said monostable device to said bi-stable device comprising a resistor in a path connected at one end to a source of substantially fixed potential and at its other end to the collector electrode of said first transistor and to the emitter electrode of said second transistor.

6. A register unit according to claim 2 said means for applying shift pulses to said first transistor comprising a source of shift pulses, and a path including a series combination of a capacitor and a unilaterally conductive device connected from said source to the emitter electrode of said first transistor.

7. A register unit according to claim 6 comprising a resistance coupled from said source of conditioning signals to a point on said path between said capacitor and said unilaterally conductive device.

8. A register unit according to claim 2, said means for maintaining the high conductivity state of said first transistor comprising an inductor connected from a source of substantially fixed potential to the base electrode of said first transistor.

9. A binary shifting register comprising a plurality of stages coupled in cascade, each stage comprising a register unit according to claim 2 and each of said units, other than the last, being coupled to the succeeding unit to constitute the source of conditioning signals for the succeeding unit.

References Cited in the file of this patent

UNITED STATES PATENTS

| | | |
|---|---|---|
| 2,404,047 | Flory et al. | July 16, 1946 |
| 2,665,845 | Trent | Jan. 12, 1954 |
| 2,724,780 | Harris | Nov. 22, 1955 |